United States Patent [19]

Kostenbader

[11] 3,738,932
[45] June 12, 1973

[54] METHOD FOR TREATING ACID WATER CONTAINING METALLIC VALUES

[75] Inventor: Paul D. Kostenbader, Bethlehem, Pa.

[73] Assignee: Bethlehem Steel Corporation, Bethlehem, Pa.

[22] Filed: Apr. 19, 1971

[21] Appl. No.: 135,292

[52] U.S. Cl. .................. 210/46, 210/50, 210/61
[51] Int. Cl. ............................................ C02c 5/04
[58] Field of Search .................. 210/50, 46, 59, 63, 210/61, 60

[56] References Cited
UNITED STATES PATENTS
3,617,559  11/1971  Cywin .............................. 210/50 X
3,617,562  11/1971  Cywin et al. ..................... 210/50 X

*Primary Examiner*—Michael Rogers
*Attorney*—Joseph J. O'Keefe

[57] ABSTRACT

Method for treating acid water containing metallic values, for example AMD and diluted waste pickle liquor, in which the acid water is treated with an alkali-water slurry, for example, high calcium lime, mixed with a portion of the sludge formed in the method. The alkali-water slurry and sludge are mixed in a first reactor for a time to obtain a uniform mix, prior to treating the acid water. The alkali-water slurry and sludge mix and the acid water flow to a second reactor. Air can be introduced into the second reactor. The acidity of the water is neutralized and a substantial portion if not all of the metallic values are oxidized and precipitated as solids. The mixture in the second reactor flows to a separating means wherein the precipitated solids settle out and form a sludge. The sludge contains about 15 percent to about 50 percent solids. To achieve the results of the invention it is necessary to recycle a portion of the sludge formed in the method. About 20 pounds of solids in the sludge are required for each pound of solids precipitated from the acid water. The treated water can be recycled in the plant or can be discharged into environmental surface water without danger of polluting same.

13 Claims, 1 Drawing Figure

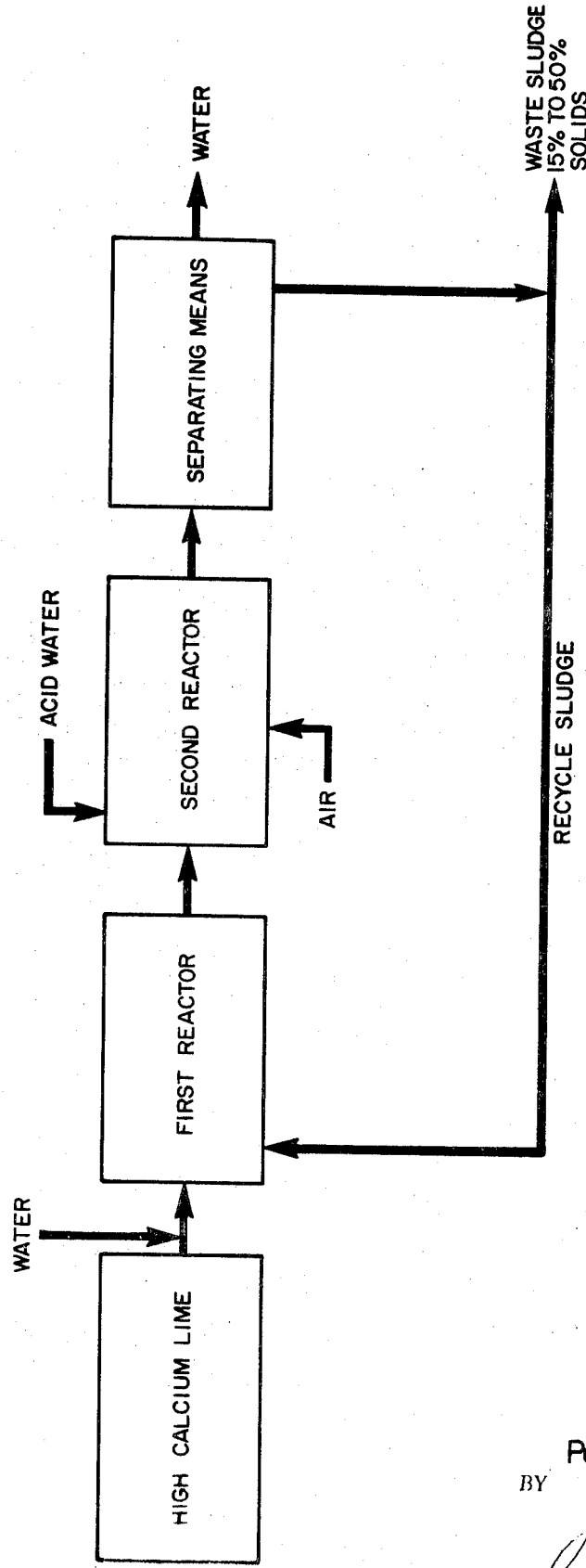

METHOD FOR TREATING ACID WATER CONTAINING METALLIC VALUES

BACKGROUND OF THE INVENTION

This invention is directed to a method for treating acid water containing metallic values, whereby the acidity of the water is neutralized and a substantial portion of the metallic values are precipitated and settle-out as solids. More specifically, the invention is directed to a method for treating acid water, such as, AMD (acid mine drainage) and diluted waste pickle liquor, which contain metallic values, such as ferrous and ferric iron and compounds of aluminum, calcium, magnesium, zinc, manganese, silicon and the like which compounds can be sulfates and/or chlorides, with a high calcium lime-water slurry mixed with a portion of the sludge formed in the method. The acidity of the water is neutralized and a substantial portion, if not all, of the metallic values are precipitated as solids in a reactor and settle-out as a densified sludge in a separating container. In the method, a specified portion of the sludge is recycled and mixed with high calcium lime-water slurry for specified reaction times and within a specified pH range.

Acid water, for example, AMD from coal mines and diluted waste pickle liquor in steel plants and the like, which contain metallic values, for example ferrous and ferric iron and compounds of aluminum, zinc, calcium, magnesium, manganese, silicon and the like which compounds are sulfates and/or chlorides, must be treated to neutralize the acidity of the water and to remove the metallic values therefrom, before the water can be passed to waste. Prior art methods to treat the acid water are directed to mixing the acid water with an alkali, such as, high calcium lime or dolomitic lime in a water slurry with or without aeration to neutralize the acidity and to precipitate insoluble solids. The mixture is allowed to stand for a period of time to allow the precipitated insoluble solids to settle-out to form a residual sludge. The residual sludge is passed to waste.

Unfortunately, the precipitated solids produced in the above described method form a sludge containing only about 1 to 2 percent solids when allowed to settle-out. As a result, it is impossible to economically dispose of the sludge thus formed.

SUMMARY OF THE INVENTION

It is the primary object of this invention to provide a method for treating acid water containing metallic values wherein the acidity of the water is neutralized and the metallic values are precipitated as solids which settle-out to form a densified sludge.

It is another object of this invention to provide a method for treating acid water containing metallic values wherein the acid water is mixed with a mix containing an alkali-water slurry and a portion of the sludge formed in the method to neutralize the acidity of the water and to precipitate the metallic values as solids which settle-out to form a densified sludge.

It is another object of this invention to provide a method for treating acid water containing metallic values including ferrous iron values wherein the acid water is mixed with a mix containing an alkali-water slurry and a portion of the sludge formed in the method in the presence of an oxygen-bearing fluid to neutralize the acidity of the water, to oxidize the ferrous iron values and to precipitate the metallic values as solids which settle-out as a densified sludge.

It is another object of this invention to provide a method for treating acid water containing metallic values in which substantially all the iron values are in the ferric state wherein the acid water is mixed with a mix containing an alkali-water slurry and a portion of the sludge formed in the method to neutralize the acidity of the water and to precipitate the metallic values as solids which settle-out to form a densified sludge.

It is another object of this invention to provide a method for treating AMD wherein a portion of the densified sludge is recycled in the system.

It is another object of this invention to provide a method for treating AMD whereby the acidity of the AMD is neutralized and the metallic values therein are oxidized to form solids and to increase the solids concentration of precipitates which are formed.

It is another object of this invention to provide a method for treating acid water containing metallic values wherein said acid water is treated with a mix containing an alkali-water slurry and recycled sludge in a reactor with or without the presence of air to neutralize the acidity of the water and to precipitate the metallic values as solids.

It is another object of this invention to provide a method for treating acid water containing metallic values with a mix containing a high calcium lime-water slurry and recycled sludge in a reactor with or without the presence of air wherein the metallic values are precipitated as insoluble solids and the solids are allowed to settle-out to form a sludge containing 15 to 50 percent solids and the acidity of the water is neutralized.

It is another object of this invention to provide a method for treating acid water containing metallic values wherein sludge containing not less than about twenty pounds of solids is recycled for each pound of solids precipitated from the acid water.

It is another object of this invention to provide a method for treating AMD containing metallic values, for example, ferrous and ferric iron and compounds of aluminum, silicon, magnesium and the like which compounds can be sulfates and/or chlorides wherein a high calcium lime-water slurry and recycled sludge mix is caused to contact the AMD in the presence of air to neutralize the acidity of the AMD, to oxidize a substantial portion, if not all, of the metallic values therein and to precipitate the metallic values as insoluble solids which settle-out to form a densified sludge containing about 15 percent to about 50 percent solids.

DESCRIPTION OF THE DRAWING

The drawing is a block diagram showing the method of the invention.

SUMMARY OF THE INVENTION

Broadly, the method of the invention is directed to treating acid water containing metallic values with an alkali-water slurry and recycled sludge mix, with or without the presence of air, to neutralize the acidity of the water and to precipitate a substantial portion, if not all, of the metallic values as solids. The solids settle-out to form a sludge containing 15 to 50 percent solids.

DESCRIPTION OF THE PREFERRED EMBODIMENT

I have found that acid water, for example, AMD from coal mines and diluted waste pickle liquor from steel plants, containing metallic values, for example ferrous and ferric iron, compounds of aluminum, silicon, calcium, magnesium and zinc which compounds can be sulfates and/or chlorides, can be treated with a mix containing an alkali-water slurry and recycled sludge formed in the method. The alkali can be high calcium lime, dolomitic lime, and sodium hydroxide. This mix thus formed neutralizes the acidity of the water, and precipitates a substantial portion, if not all, of the metallic values therein as solids, which solids settle-out to form a sludge containing 15 to 50 percent solids.

I have found that if the iron in the acid water is substantially all in the ferrous state, air must be provided during the neutralization-oxidation step to oxidize the iron. The metallic values are also precipitated. It is not necessary to provide air during the neutralization-oxidation step if the iron values in the acid water are substantially all in the ferric state. In the latter case, neutralization of the acidity of the water will cause precipitation of the metallic values therein.

The method of the invention is diagrammatically shown in the drawing. An alkali, for example, high calcium lime, magnesia, dolomitic lime and sodium hydroxide and the like, is mixed with water to form a slurry. I prefer to use high calcium lime as the alkali. By high calcium lime, I mean lime which is the product of the calcination of high calcium limestone. High calcium limestone is a general term for stone containing calcium carbonate and little (about 2 to 4 percent) magnesium carbonate. The high calcium lime-water slurry, which for practical considerations can be 1 to 10 percent high calcium lime, flows to a first reactor. A portion of the sludge settled in the final step of the method, is passed to the first reactor. I have found that it is necessary to recycle a sludge containing not less than about 20 pounds of solids for each pound of solids precipitated from the acid water. It is preferred to recycle a sludge containing about 20 pounds to about thirty pounds of solids for each pound of solids precipitated. The high calcium lime-water slurry and recycled sludge are mixed for a time, at least 1 second, to achieve the results of the invention. The chemical reactions which occur between the high calcium lime-water slurry and recycled sludge in the first reactor are very rapid. Very little is known or understood concerning these reactions, however, the results of the invention are not achieved unless the contact between the high calcium lime-water slurry and recycled sludge is achieved. Of course, it must be understood that the retention time in the first reactor can be indeterminably long but economic considerations, for example, size and cost of the first reactor, dictate that the time be of relatively short duration. I prefer to mix the high calcium lime-water slurry and recycled sludge for not less than 1 second and not longer than 20 minutes.

The high calcium lime-water slurry and recycled sludge mix flows to a second reactor. The acid water also flows into the second reactor. The high calcium lime-water slurry and recycled sludge mix react (in a neutralization-oxidation step) with the acid water in the presence of air, which is bubbled through the reacting mixes. The acidity of the water is neutralized, that is, the pH value is modified to not less than 7.0. The oxygen in the air oxidizes substantially all the ferrous iron to insoluble hydrated ferric oxide. The compounds of aluminum, calcium, magnesium, silicon and zinc are precipitated as insoluble hydroxides and sulfates. The time in the second reactor can be as little as 5 minutes and as long as necessary to obtain substantially complete oxidation and precipitation of metallic values as insoluble solids. I prefer to use a time of about 5 minutes to about 20 minutes. The acidity of the water is neutralized, that is, the water has a pH of not less than 7.0 and may be as much as 9.0. I prefer to produce a pH of about 7.0 to 8.0 in the water in the second reactor to obtain optimum results.

The high calcium lime-water slurry-recycled sludge-acid water mixture flows to a separating means, for example, a thickener or a settling pond or the like. The precipitated solids settle-out to form a sludge containing about 15 percent to about 50 percent solids. As noted previously, a portion of the sludge is recycled to the first reactor. The remaining sludge is disposed of as a waste product. The clarified neutralized water can be recycled in the system or can be disposed of in environmental surface water.

While I have shown the use of air to oxidize ferrous iron values in the acid water, it must be understood that if substantially all the iron values are in the ferric state, it is not necessary to use air to oxidize the iron values therein. The metallic values will precipitate as solids when the acidity of the water is neutralized.

If the iron values in the acid water are in the ferric state a sludge containing about 15 percent to about 20 percent solids is obtained whereas if the iron values are in the ferrous state, a sludge containing up to about 50 percent solids is obtained. Acid water containing both ferrous and ferric iron values can be treated to obtain a sludge containing between about 15 percent to about 50 percent solids dependent upon the amount of ferrous iron values therein.

Whenever percentages are specified in the specification and claims such percentages are on a weight basis unless otherwise noted.

In a specific example of the invention, AMD having a pH of 2.8–3.1 and having the following composition (in parts per million):

| $Fe^{+2}$ | $Fe^7$ | $Al_2O_3$ | CaO | MgO | $SO_4$ |
|---|---|---|---|---|---|
| 225 to 350 | 300 to 350 | 200 | 250 | 50 | 2100 | was treated for a period of about eight hours according to the method of the invention. A throughput of 100 milliliters per minute was maintained in the apparatus. About 10 grams of hydrated lime (made from high calcium lime) was mixed with a liter of distilled water to make a lime slurry. An average of about 55 milliliters per minute of recycled sludge containing about 15 percent solids were mixed with the lime slurry. The retention time was varied from 0.1 to 20 minutes in the first reactor. The mixture flowed to the neutralization-oxidation step or second reactor. The retention time of the AMD and mixture in the second reactor was varied between 10–20 minutes. The pH of the solution was within the range of about 7.1 to 8.0. The AMD and mixture flowed to a thickener. About 1,000 ppm. of solids were precipitated from the AMD. Settled sludge separated from the treated water contained about 50 percent solids. Sludge in excess of that required for recycle was drained from the bottom of the thickener and was discarded. The clarified neutralized water from the thickener had a pH within the range of 7.1–8.0 and was substantially free of dissolved iron.

In another specific example of the invention, AMD having a pH of 2.8 to 2.9 and having the following composition (in parts per million):

| | |
|---|---|
| $Fe^{+2}$ | 60 to 120 |
| $Fe^T$ | 200 to 320 |
| $Al_2O_3$ | 170 to 330 |
| CaO | 230 to 270 |
| MgO | 10 to 120 |
| Mn | 7 to 9 |
| $SiO_2$ | 40 to 70 |
| $SO_4$ | 1900 to 2200 | was treated for 1 week according to the method of the invention. A throughput of 3 gallons per minute was maintained in the apparatus. From about 0.1–1.0 pound of high calcium lime was mixed with 9–10 pounds of water to make the high calcium lime slurry. About 1.5 gallons per minute of recycled sludge containing about 6.5 percent solids were mixed with the lime slurry in a retention time of about 20 minutes in the first reactor. The mixture was pumped to the neutralization-oxidation step or second reactor. The retention time of the AMD and mixture in the second reactor was 10–12 minutes. The pH of the solution was within the range of 7.0–7.8. The AMD and mixture flowed to a thickener. About 1,054 ppm of sludge was precipitated from the AMD. The settled sludge separated from the water contained 15 percent solids. Sludge, in excess of that required for recycle, was drained from the bottom of the thickener and was discarded. The clarified neutralized water that overflowed from the thickener had a pH of 7.0 to 7.8 and had the following dissolved solids composition (in parts per million):

| $Fe^T$ | $Al_2O_3$ | CaO | MgO | Mn | $SiO_2$ | $SO_4$ |
|---|---|---|---|---|---|---|
| <1 | 2 to 8 | 850 to 1040 | 50 to 170 | up to 8 | up to 10 | 1880 to 2440 |

In another specific example of the invention, AMD having a pH of 3.0–3.2 and having the following average chemical composition (in parts per million):

| $Fe^{+2}$ | $Fe^T$ | $Al_2O_3$ | $SiO_2$ | Mn | CaO | MgO | $SO_4$ |
|---|---|---|---|---|---|---|---|
| 140 | 150 | 80 | 40 | 5 | 170 | 10 | 1400 | was treated for a period of about 1 week according to the method of the invention. A throughput of 800–1,000 gallons per minute was flowed through the apparatus. Settled sludge separated from the treated water contained 30–40 percent solids when practicing the preferred method of maintaining the recycle solids at 20 to 30 pounds for each pound of solids precipitated from the AMD, using a mixing or reaction time of 0.1–10 minutes in the first reactor and a reaction-oxidation time of about 10 minutes in the second reactor. The reaction pH in the second reactor was within the range of 7.0–8.0. About 450 ppm of solids were precipitated from the AMD and sludge in excess of that required for recycle was drained from the bottom of the thickener and was discarded. The clarified neutralized water from the thickener was substantially free of dissolved iron.

In another specific example of the invention applied to a metal-bearing waste from a steel plant, a diluted acid waste having a pH of 1.3–2.4 and having the following composition (in parts per million):

| $Fe^{+2}$ | $Fe^T$ | Zn | $SO_4$ |
|---|---|---|---|
| 257 to 1022 | 402 to 1130 | 3 to 120 | 790 to 5300 | was treated according to a preferred method of the invention. A throughput of 2–4 gallons per minute was treated in the apparatus. Settled sludge separated from the treated water contained as much as 45 percent solids when practicing the preferred treatment method. From 700 ppm to 7,000 ppm of solids were precipitated from the waste, and the clarified neutralized water from the thickener had a pH of 7.5 to 8.0, was substantially free of dissolved iron and contained 0.6–7.0 ppm Zn.

I claim:

1. In a method for treating acid water containing metallic values to neutralize the acidity thereof and to oxidize and precipitate a substantial portion of the metallic values as solids and to produce a densified sludge thereof, the method comprising:
   a. forming a slurry of water and at least one alkali taken from the group consisting of high calcium lime, magnesia, dolomitic lime and sodium hydroxide,
   b. mixing the slurry of step (a) with a portion of the densified sludge produced in step (d) in a first reactor for a time to obtain a uniform mix consisting essentially of said slurry and said densified sludge portion,
   c. thereafter mixing the mix of step (b) and acid water in a second reactor to cause the mix and acid water to react in the presence of air to neutralize the acidity of the acid water and to oxidize and precipitate a substantial portion of the metallic values therein as solids and forming a mixture thereof,
   d. passing the mixture of step (c) to a separating means wherein the precipitated solids settleout to form a densified sludge containing about 15 percent to about 50 percent solids thereby obtaining clarified neutralized water, and e. drawing the clarified neutralized water from the separating means and passing a portion of the densified sludge to waste.

2. In a method for treating acid water containing metallic values in the form of ferrous and ferric iron and compounds taken from the group consisting of aluminum, calcium, magnesium, silicon and zinc, said compounds being sulfates and/or chlorides, wherein the acidity of the water is neutralized and substantially all the ferrous and ferric iron values and a substantial portion of the other metallic values are precipitated as solids, which solids settle-out to produce a densified sludge containing about 15 percent to about 50 percent solids, the method comprising:
   a. mixing water and at least one alkali taken from the group consisting of high calcium lime, magnesia, dolomitic lime and sodium hydroxide to make a slurry, b. passing the slurry of step (a) to a first reactor,
   c. recycling a portion of densified sludge formed in step (f) to the first reactor,
   d. mixing the slurry of step (a) and the portion of densified sludge of step (c) for a time to obtain a uniform mix consisting essentially of said slurry and said densified sludge portion,
   e. thereafter mixing the mix of step (d) with the acid water in a second reactor in the presence of air for a time to neutralize the acidity of the water and to oxidize the ferrous iron values and precipitate substantially all the iron values and a substantial portion of the metallic values as solids, f. passing the mixture of step (e) to a separating means wherein the precipitated solids settle-out to form a densified sludge containing about 15 percent to about 50 percent solids thereby obtaining clarified neutralized water, and g. drawing off the clarified neutralized water as an overflow from the separating means, and passing a portion of the densified sludge to waste.

3. The method of claim 2 in which the alkali of step (a) is high calcium lime.

4. The method of claim 2 in which said portion of the sludge of step (c) contains at least about 20 pounds of solids per pound of solids precipitated in the second reactor.

5. The method of claim 2 in which the time of mixing of step (d) is not less than 1 second.

6. The method of claim 2 in which the time of mixing in step (e) is about 5 minutes to about 20 minutes.

7. The method of claim 2 in which the acid water is neutralized to a pH of about 7.0 and to about 9.0 with a preferred range of about 7.0 to about 8.0 in step (e).

8. The method of claim 2 wherein the acid water is waste acid pickle liquor from a steel plant.

9. In a method for treating acid water containing iron values in the form of ferric iron and compounds taken from the group consisting of aluminum, calcium, magnesium, silicon and zinc, the compounds being sulfates and/or chlorides, wherein the acidity of the water is neutralized and substantially all of the ferric iron values and a substantial portion of the other metallic values are precipitated as solids, which solids settle-out to produce a densified sludge containing at least about 15 percent solids, the method comprising:

a. mixing water and at least one alkali taken from the group consisting of high calcium lime, magnesia, dolomitic lime and sodium hydroxide to form a slurry thereof, b. passing the slurry of step (a) to a first reactor, c. recycling a portion of the densified sludge formed in step (f) to the first reactor, d. mixing the slurry of step (a) and the portion of the densified sludge of step (c) for a time to obtain a uniform mix consisting essentially of said slurry and said densified sludge portion, e. thereafter mixing the mix of step (d) with the acid water in a second reactor to neutralize the acidity of the water and to precipitate the metallic values as solids, f. passing the materials of step (e) to a separating means wherein the precipitated solids settle-out to form a densified sludge containing at least about 15 percent solids and clarified neutralized water, and g. drawing off the clarified neutralized water as an overflow from the separating means and passing a portion of the densified sludge to waste.

10. In a method for treating acid water containing metallic values in the form of ferrous and ferric iron and compounds taken from the group consisting of aluminum, calcium, magnesium, silicon, and zinc, said compounds being sulfates and/or chlorides, wherein the acidity of the water is neutralized and substantially all the ferrous and ferric iron values and a substantial portion of the other metallic values are precipitated as solids, which solids settle-out to produce a densified sludge containing about 15 percent to about 50 percent solids, the method comprising:

a. mixing high calcium lime and water to form a slurry of about 1 percent to about 10 percent high calcium lime, b. passing the slurry to a first reactor, c. passing a portion of sludge formed in step (f) to the first reactor, said portion containing about 20 pounds to about 30 pounds of solids for each pound of metallic values precipitated in step (e), d. mixing the slurry of step (a) and the portion of sludge of step (c) for a time between about one second and about 20 minutes to form a mix consisting essentially of said slurry and said sludge portion, e. thereafter mixing the mix of step (d) with the acid water in a second reactor for about 5 minutes to about 20 minutes in the presence of air to neutralize the acidity of the water to a pH of about 7.0 to about 9.0, with a preferred range of about 7.0 to about 8.0, and to oxidize substantially all the ferrous iron and to precipitate substantially all the iron values and a substantial portion of the other metallic values as solids, f. passing the mixture of step (e) to a thickener wherein the precipitated solids settle-out to form a sludge containing about 15 percent to about 50 percent solids and to obtain clarified neutralized water, and g. drawing off the clarified neutralized water as an overflow from the thickener and passing sludge to waste.

11. In a method for treating acid water containing metallic values in the form of ferric iron and compounds taken from the group consisting of aluminum, calcium, magnesium, silicon, and zinc, said compounds being sulfates and/or chlorides, wherein the acidity of the water is neutralized and substantially all the ferric iron values and a substantial portion of the other metallic values are precipitated as solids, which solids settle-out to produce a densified sludge containing at least about 15 percent solids, the method comprising:

a. mixing high calcium lime and water to form a slurry of about 1 percent to about 10 percent high calcium lime, b. passing the slurry to a first reactor, c. passing a portion of sludge formed in step (f) to the first reactor, said portion containing about 20 pounds to about 30 pounds of solids for each pound of metallic values precipitated in step (e), d. mixing the slurry of step (a) and the portion of sludge of step (c) for a time between about one second and about 20 minutes to form a mix consisting essentially of said slurry and said sludge portion, e. thereafter mixing the mix of step (d) with the acid water in a second reactor for about 5 minutes to about 20 minutes to neutralize the acidity of water to a pH of about 7.0 to about 9.0 with a preferred range of about 7.0 to about 8.0, and to precipitate substantially all the iron values and a substantial portion of the other metallic values as solids, f. passing the mixture of step (e) to a thickener wherein the precipitated solids settle-out to form a sludge containing at least about 15 percent solids and to obtain clarified neutralized water, and g. drawing off the clarified neutralized water as an overflow from the thickener and passing sludge to waste.

12. In a method for treating acid water containing metallic values in the form of ferrous iron and compounds taken from the group consisting of aluminum, calcium, magnesium, silicon and zinc, said compounds being sulfates and/or chlorides, wherein the acidity of the water is neutralized and substantially all the ferrous iron values and a substantial portion of the other metallic values are precipitated as solids, which solids settle-out to produce a densified sludge containing about 50 percent solids, the method comprising:
  a. mixing water and at least one alkali taken from the group consisting of high calcium lime, magnesia, dolomitic lime, and sodium hydroxide to form a slurry thereof,
  b. passing the slurry of step (a) to a first reactor,
  c. recycling a portion of the densified sludge formed in step (f) to the first reactor,
  d. mixing the slurry of step (a) and the portion of the densified sludge of step (c) for a time to obtain a uniform mix consisting essentially of said slurry and said densified sludge portion,
  (e) thereafter mixing the mix of step (d) with the acid water in a second reactor to neutralize the acidity of the water and to precipitate the metallic values as solids,
  f. passing the materials of step (e) to a separating means wherein the precipitated solids settle-out to form a densified sludge containing about 50 percent solids and clarified neutralized water, and
  g. drawing off the clarified neutralized water as an overflow from the separating means and passing a portion of the densified sludge to waste.

13. In a method for treating acid water containing metallic values in the form of ferrous iron and compounds taken from the group consisting of aluminum, calcium, magnesium, silicon and zinc, which compounds are sulfates and/or chlorides wherein the acidity of the water is neutralized and substantially all the ferrous iron and a substantial portion of the other metallic values are precipitated as solids, which solids settle-out to form a densified sludge containing about 50 percent solids, the method comprising:
  a. mixing high calcium lime and water to form a slurry of about 1 percent to about 10 percent high calcium lime,
  b. passing the slurry to a first reactor,
  c. passing a portion of densified sludge formed in step (f) to the first reactor, the portion of densified sludge containing about 20 pounds to about 30 pounds of solids for each pound of metallic values precipitated in step (e),
  d. mixing the slurry of step (a) and the portion of densified sludge of step (c) for about one second to about 20 minutes to obtain a uniform mix consisting essentially of said slurry and said densified sludge portion,
  e. thereafter mixing the mix of step (d) with the acid water in a second reactor for about 5 minutes to about 20 minutes to neutralize the acidity of the acid water to a pH of about 7.0 to about 9.0 with a preferred range of about 7.0 to about 8.0 and to precipitate substantially all the ferrous iron values and a substantial portion of the metallic values as solids,
  f. passing the mixture of step (e) to a thickener wherein the precipitated solids settle-out to form a densified sludge containing about 50 percent solids and to obtain clarified neutralized water, and
  g. drawing off the clarified neutralized water as an overflow from the thickener and passing a portion of the densified sludge to waste.

* * * * *

Dedication 3,738,932.—*Paul D. Kostenbader*, Bethlehem, Pa. METHOD FOR TREATING ACID WATER CONTAINING METALLIC VALUES. Patent dated June 12, 1973. Dedication filed June 1, 1976, by the assignee, *Bethlehem Steel Corporation*.

Hereby dedicates to the Public the entire remaining term of said patent.

[*Official Gazette January 11, 1977.*]